(12) United States Patent
Lim

(10) Patent No.: US 6,403,159 B1
(45) Date of Patent: Jun. 11, 2002

(54) LAMINATE FILM

(75) Inventor: Takwan Lim, Inchon (KR)

(73) Assignee: Royal Sovereign Korea, INC, Inchon (KR)

( * ) Notice: Subject to any disclaimer, the term of this patent is extended or adjusted under 35 U.S.C. 154(b) by 0 days.

(21) Appl. No.: 09/075,181

(22) Filed: May 11, 1998

(51) Int. Cl.$^7$ ............................................... B32B 31/20
(52) U.S. Cl. .................... 427/359; 427/365; 427/372.2; 427/374.1; 427/402; 427/407.1; 428/141; 428/200; 428/203; 428/516; 428/523; 428/480; 428/483; 283/107; 156/87; 156/219; 156/220; 156/307.3; 156/307.5; 156/334; 156/242; 156/209
(58) Field of Search ................................. 428/141, 200, 428/203, 516, 523, 480, 483; 283/107; 156/87, 219, 220, 307.3, 307.5, 334, 242, 209; 427/359, 365, 372.2, 374.1, 402, 407.1

(56) References Cited

U.S. PATENT DOCUMENTS

| | | | | |
|---|---|---|---|---|
| 3,836,414 A | | 9/1974 | Staats ........................... 156/87 |
| 3,957,556 A | * | 5/1976 | Wilson et al. ................. 156/87 |
| 4,132,582 A | * | 1/1979 | Winkler ....................... 156/209 |
| 4,429,015 A | * | 1/1984 | Sheptak ....................... 428/201 |
| 5,882,469 A | * | 3/1999 | Detterman et al. ......... 156/359 |
| 5,980,675 A | * | 11/1999 | Tsuchihashi et al. ........ 156/197 |
| 6,030,701 A | * | 2/2000 | Johnson et al. ............. 428/343 |

* cited by examiner

Primary Examiner—William P. Watkins, III
(74) Attorney, Agent, or Firm—IP Strategies, P.C.

(57) ABSTRACT

A laminate film has a composite structure and a bonding surface that eliminates the formation of air bubbles during the lamination process. A process for forming the laminate film includes spreading a PET film with an adhesive, drying the adhesive, and spreading a PE film, which is in a melted phase, on the dried adhesive, to form a composite film. An EVA fluid is spread on the PE film of the composite film, and the composite film with the EVA fluid is passed between first and second rollers. The first roller has a pockmarked surface and contacts the EVA fluid, thereby forming a pockmarked surface on the EVA fluid.

6 Claims, 2 Drawing Sheets

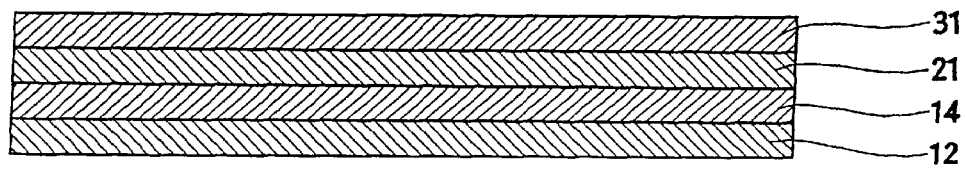
FIG 4
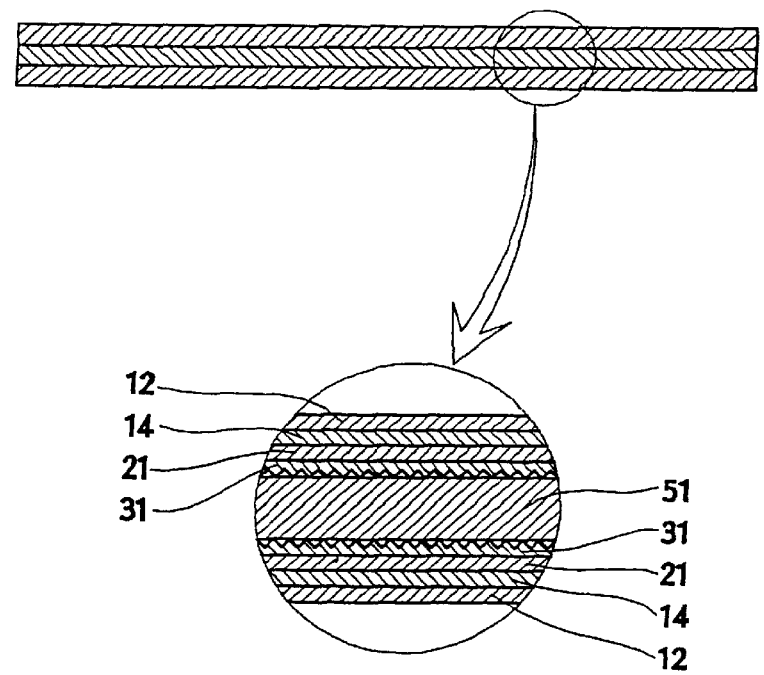
FIG 5
FIG 5A

LAMINATE FILM

BACKGROUND OF THE INVENTION

1. Field of the Invention

The present invention relates to a laminate film. Particularly the present invention relates to a transparent laminate film to be coated on photographs or papers by applying heat and pressure, so that the photographs or papers can be prevented from being damaged, and that they can be kept for a long time.

2. Description of the Prior Art

Generally, the conventional laminate film is a composite film which is formed by attaching an extendable film such as a polyester film (PET), an extendable polyester film (OPP) or the like to a non-extendable film such as a polyethylene film (PE), a polypropylene film (PP), a linear polyethylene film (LLDPE) or the like.

In this conventional composite laminate film consisting of an extendable film and a non-extendable film, its surface is too slippery. Therefore, when it is heat-pressure-bonded to a photograph or the like by passing them through a pressing machine, the attaching strength becomes insufficient. As a result, a sure bonding cannot be achieved. Further, air pores remain between the laminate film and the photograph or the like, and in this case, a perfect see-through cannot be achieved due to the blots which are formed by the air pores.

SUMMARY OF THE INVENTION

The present invention is intended to overcome the above described disadvantages of the conventional technique. In the laminate film of the present invention, the air pores are eliminated from between the laminate film and an object such as a photograph or the like, so that blots would not occur, and that the object such as a photograph can be kept for a long time without being faded.

Therefore, it is an object of the present invention to provide a laminate film in which air pores are not formed between the laminate film and an object such a photograph or the like, so that the object such as a photograph can have a clear see-through surface.

It is another object of the present invention to provide a laminate film in which the laminate film is closely and perfectly attached on the object such as a photograph or the like.

It is still another object of the present invention to provide a laminate film in which the object such as a photograph or the like attached with the laminate film can be kept for a long time without being damaged.

The laminate film is a composite film consisting of an extendable film and a non-extendable film. Between these two layers, there is spread an adhesive for a sure bonding of the two layers. Further, on the inner surface of the extendable film, which is to be bonded to an object such as a photograph or the like, there is also spread an adhesive to promote the adhering strength.

In other to achieve the above objects, an embossing effect is provided on the adhesive layer of the extendable film so that the air pores can be eliminated, and that a firm bonding can be ensured.

The embossing effect is realized by passing an embossing roller on the fluid phase adhesive layer of the extendable film.

BRIEF DESCRIPTION OF THE DRAWINGS

The above objects and other advantages of the present invention will become more apparent by describing in detail the preferred embodiment of the present invention with reference to the attached drawings in which:

FIG. 4 is an enlarged sectional view of the conventional device; and

FIG. 5 is a sectional view showing the using state of the device of the present invention.

DETAILED DESCRIPTION OF THE PREFERRED EMBODIMENT

Figure 1:
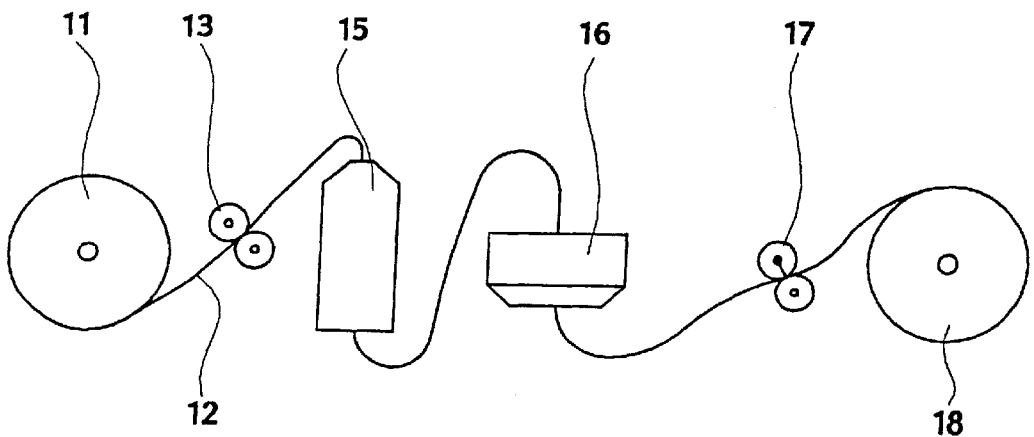
FIG. 1 illustrates a first step of the manufacturing process of the laminate film according to the present invention.
Figure 2:
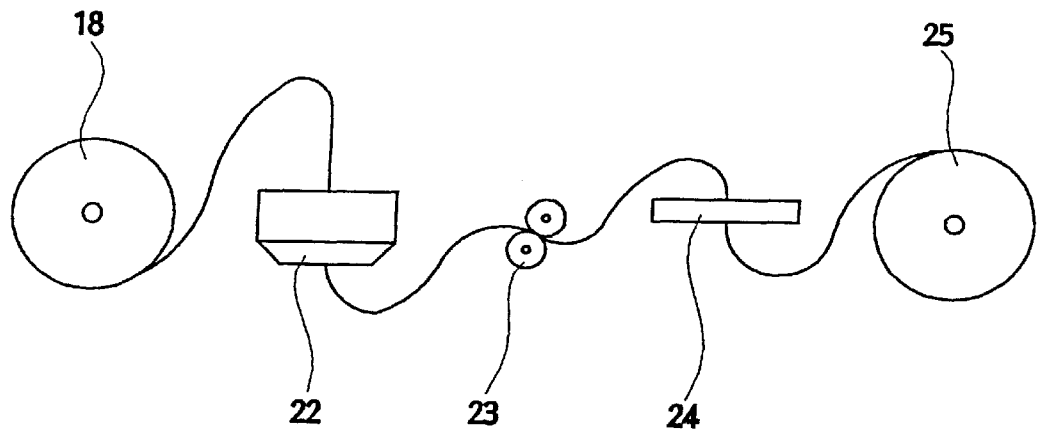
FIG. 2 illustrates a second step of the manufacturing process of the laminate film according to the present invention.
Figure 3:
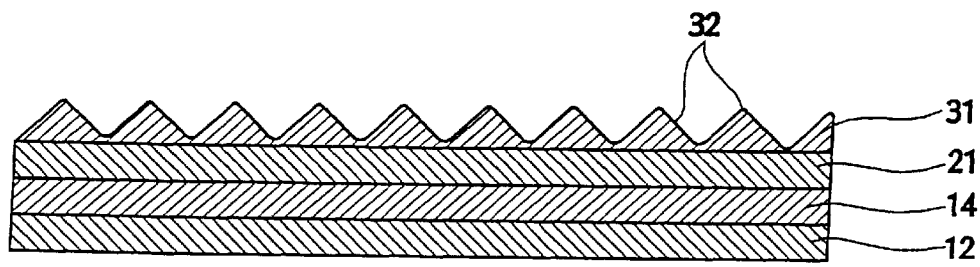
FIG. 3 is an enlarged sectional view of the device of the present invention.

Prior to describing the present invention, the manufacturing process for the general laminate film will be described. The laminate film manufacturing process includes the steps of: attaching a PET film to a PE film as shown in FIG. 1 (first step); and spreading an adhesive layer on the composite film thus formed as shown in FIG. 2 (second step).

That is, at the first step, the PET film as an extendable film is coupled to the PE film as a non-extendable film The PET film 12 which is wound on a roll 11 is spread with an adhesive 14 by passing it through between anchor coating rollers 13. Then the spread adhesive is dried by passing the film through a drying chamber 15. Then the PE film 21 which is in a melted phase at a temperature of 300–350 degrees C. is spread on the PET film 12 by using a spreader 16. Then the composite film is passed through cooling rollers 17, and then, is wound an another roll 18. Then the cooled composite film is aged in an aging chamber at a temperature of 45–60 degrees C. for 12–24 hours. The above are the first step of the manufacturing process.

The anchor coating roller 13 spreads an adhesive solution on the PET film 11 so that the melted PE fluid can be easily adhered on the PET film 12. The adhesive solution consists of 80% of MEK, 17% of an adhesive and 3% of a curing agent.

At the second step, the composite film consisting of the PET film 12 and the PE film 21, which is wound on the roll 18, is passed through an EVA fluid spreader 22, so that an EVA fluid having a temperature of 240–260 degrees C. can be spread on the surface of the PE film 21. Then the composite film is cooled by passing it through cooling rollers 23. Then a corona treatment is carried out by using a microwave treater 24, and then, the composite film is wound on a roll 25.

In the above process, after the spreading of the EVA fluid on the PE film 21, one of the cooling rollers 23 has pockmarks. Therefore, an embossing effect is realize in such a manner that the pockmarks are formed and cured almost simultaneously. Thus the pockmarked embossing 32 are formed on the EVA adhesive layer 31.

The laminate film thus manufactured is attached on an object such as a photograph or the like in the following manner. That is, two layers of the composite laminate film receive an object 51 such as a photograph or the like into between them Then they are passed through a laminating machine, so that the two layers of the film and the object can be unitized. Thus the object such as a photograph is coated.

In the above, when inserting the object into between the two layers of the film, the embossing 32 of the EVA adhesive layer 31 is made to lie on the inner face so that the object 51 can be contacted with the embossing 32. Then the coupled sheets are passed through the laminating machine, so that they would be pressure-bonded together. During the passing through the laminating machine, the air captured between the sheets in the form of air pores is discharged through the embossing 32. Therefore, the air pores are completely eliminated, and therefore, a clear coating can be obtained.

According to the present invention as described above, the disadvantages of the conventional technique are overcome. That is, in the conventional technique, the PE film is very slippery, and therefore, when the composite film is passed through the laminating machine, the film layers cannot be firmly and perfectly attached together. Further, air pores remain between the film layers even after passing through the laminating machine. Therefore blots are formed on the surface of the film These defects are completely overcome in the present invention.

That is, in the present invention, one of the cooling rollers is provided with pockmarks, so that embossing can be formed and cured almost simultaneously on the EVA surface of the film during the passage of the composite film through the cooling rollers. Therefore, the air pores are completely discharged through the embossing during the passage of the film through the laminating machine.

What is claimed is:

1. A process for forming a laminate film, comprising:

spreading a PET film with an adhesive;

drying the adhesive;

spreading a PE film, which is in a melted phase, on the dried adhesive, to form a composite film;

spreading an EVA fluid on the PE film of the composite film; and passing the composite film with the EVA fluid between first and second rollers, wherein the first roller has a pockmarked surface and contacts the EVA fluid, thereby forming a pockmarked surface on the EVA fluid.

2. The process of claim 1, further comprising aging the composite film at a temperature of 45° C. to 60° C. for 12 to 24 hours.

3. The process of claim 1, wherein the EVA fluid that is spread on the PE film is at a temperature of 240° C. to 260° C.

4. The process of claim 3, wherein the first and second rollers are cooling rollers for cooling the composite film having the EVA fluid.

5. The process of claim 4, further comprising carrying out a corona treatment by applying a microwave treater to the composite film, after passing the composite film with the EVA fluid between first and second rollers.

6. The process of claim 4, wherein the first roller cures the pockmarks as the pockmarks are formed.

* * * * *